March 27, 1934. V. OLEN 1,953,056
PLATE GLASS TRANSPORTING MECHANISM
Filed April 4, 1932 2 Sheets-Sheet 2

Inventor
Victor Olen
Attorney

Patented Mar. 27, 1934

1,953,056

UNITED STATES PATENT OFFICE 1,953,056

PLATE GLASS TRANSPORTING MECHANISM

Victor Olen, Wauwatosa, Wis., assignor, by mesne assignments, to Alma Harry

Application April 4, 1932, Serial No. 603,104

3 Claims. (Cl. 214—75)

This invention relates to mechanism for transporting sheet glass and particularly plate glass.

Equipment heretofore employed in plate glass transporting trucks ordinarily requires the services of several men to elevate and pack the glass onto or into the truck at the place of shipment and to later unpack and remove the glass from the truck at the place of use. Such glass handling methods are not only laborious and time consuming tasks, which require great care and skill to reduce glass breakage to a minimum, but they are also a source of grave danger to the men employed.

One object of the present invention is to facilitate and expedite the loading and unloading of plate glass onto and from a transporting vehicle and to substantially eliminate the hazards heretofore involved.

Another object is the provision in a plate glass transporting truck of a glass loading and carrier mechanism arranged in such manner as to reserve ample space on the truck for the receipt and safe carriage of other glazier's equipment, such as ladders, crates, etc.

Another object is the provision in a plate glass transporting truck of glass carrying equipment which may be lowered to avoid overhead obstructions, such as bridges or the like, which may be encountered along the road.

Other more specific objects and advantages will appear from the following description of an illustrative embodiment of the present invention.

In the accompanying drawings:—

The glass loading and carrier mechanism selected for illustration comprises a pair of flat rectangular racks 10 mounted in substantially upright position at opposite sides of the truck frame 11. Each rack is preferably inclined inwardly from a true vertical position to form a substantially flat bed against which the glass may be stacked, and each is provided with appropriate means, such as a ledge 12, adjacent the lower edge thereof, for coaction with the edges of the glass to support the same.

Figure 3:
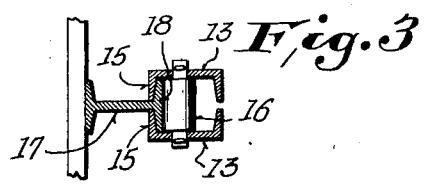
Figure 3 is a sectional view on the line 3—3 of Fig. 1 on a somewhat larger scale.

Each rack 10 is slidably mounted upon a plurality of upright inclined guides 13 which in this instance comprise integral parts of a plurality of upright A-frames 14. As indicated particularly in Figs. 1 and 3, each guide 13 is formed by two cooperating channel sections arranged with their flanges 15 turned inwardly and having a pair of guide rollers 16 mounted therebetween at the upper and lower ends thereof. Each rack is provided with a plurality of I-beams 17 fixed to the rear thereof, each beam 17 having a flanged edge 18 slidably confined within one of the guides 13 between the rollers 16 and one set of flanges 15.

Figure 1:
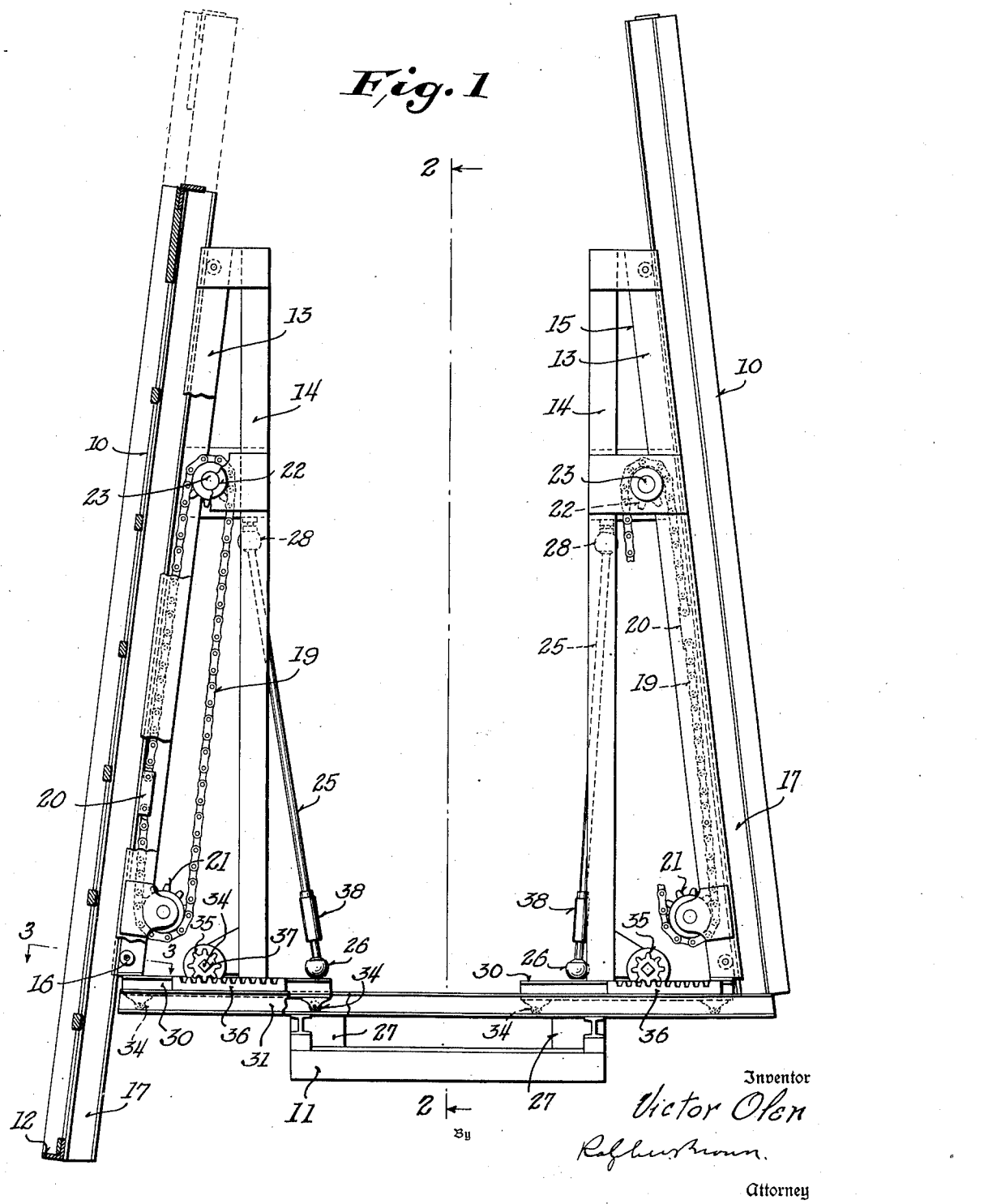
Fig. 1 is a fragmentary end view, partly in section, of a glass transporting truck equipped with glass loading and carrier mechanism constructed in accordance with the present invention.

Provision is made for adjusting each rack 10 along the guides 13, so that either may be lowered to a convenient loading and unloading height, such as indicated by the full line position at the left of Fig. 1, or elevated to a carrying position, such as indicated by the dotted lines in Fig. 1. Although this may be effected in various ways the mechanism shown for that purpose has proven satisfactory. This mechanism comprises a plurality of endless chains 19 each mounted within one of the frames 14 and each secured to a block 20 welded or otherwise fixed to the flanged edge 18 of one of the beams 17. Each chain 19 is trained about a lower idler sprocket 21 and an upper driving sprocket 22 fixed to a drive shaft 23.

One drive shaft 23 is provided for each rack, each being journalled in and extending through that set of frames 14 which together support the rack. Each shaft 23 is driven from the truck motor, through an appropriate power take-off, not shown, and through appropriate shafting 24 and 25, shaft 24 being connected to shaft 25 through a universal joint 26 and a set of miter gears contained in a housing 27, and shaft 25 being connected to shaft 23 through a universal joint 28 and a worm and worm wheel contained in a housing 29.

Each rack 10 is also preferably so mounted as to permit adjustment thereof transversely of the truck and in this instance each of the several frames 14 is mounted upon an appropriate transversely movable carriage 30 for that purpose.

Figure 2:
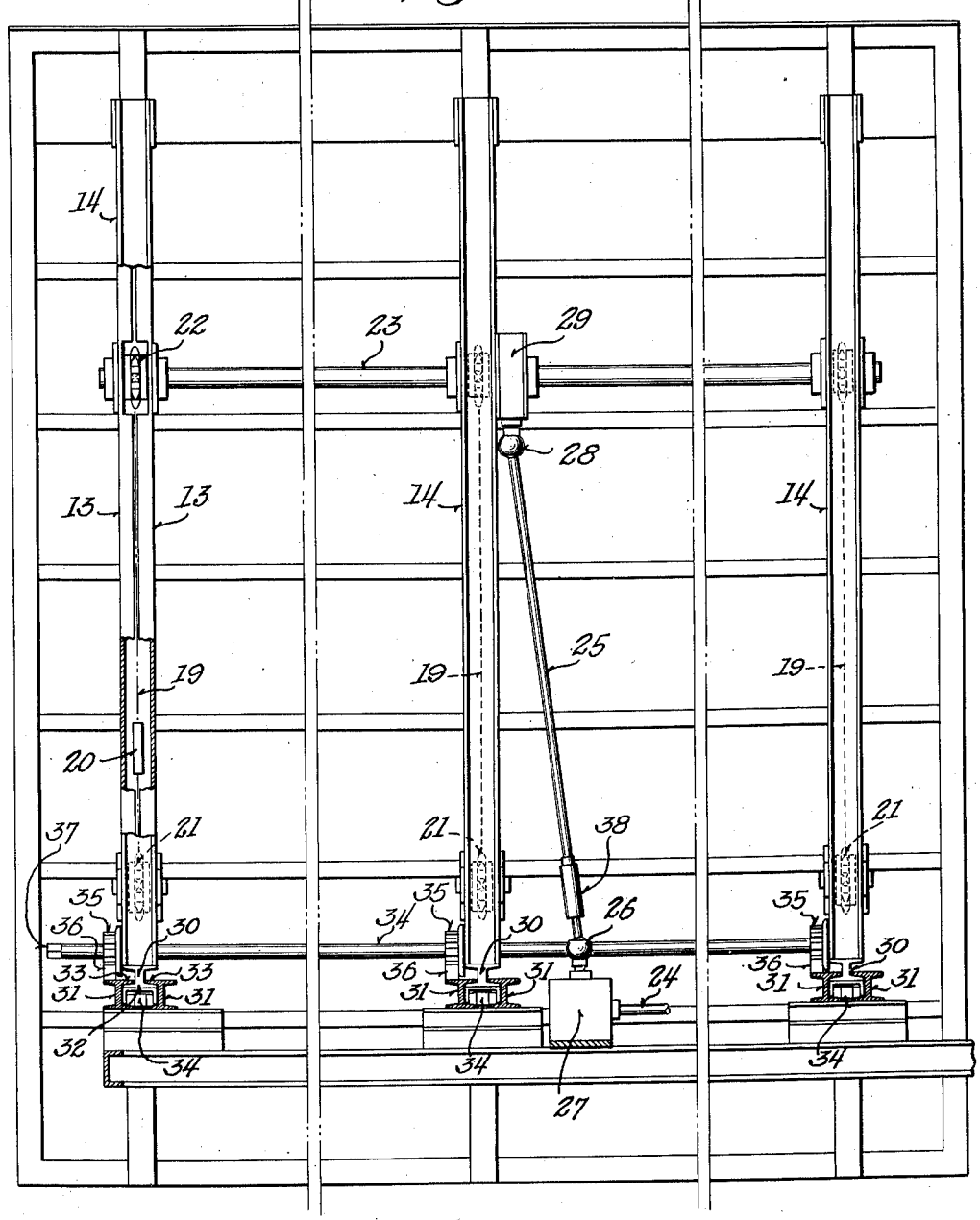
Fig. 2 is a foreshortened sectional view on the line 2—2 of Fig. 1.

Each carriage 30 comprises a short I-beam section guided by and between a closely associated pair of transverse I-beams 31 mounted on the truck frame 11. As indicated particularly in Fig. 2, the base flange 32 of each carriage 30 is closely confined beneath the upper flanges 33 of the beams 31, and each is mounted upon a pair of rollers 34 which ride upon the base flanges of the beams 31.

That set of carriages 30 on either side of the truck are simultaneously actuated and controlled preferably by a shaft 34 which is carried by the 110 several frames 14 on that side of the truck, each shaft 34 having a plurality of gears 35 fixed thereto and each meshing with a stationary rack 36 fixed to one of the transverse beams 31. Each shaft 34 is preferably squared or otherwise fashioned at one end 37 to receive a wrench or other appropriate tool for operating the same. The arrangement is such that when either of the shafts 34 is turned the gears 35 thereon are actuated so as to roll along their coacting stationary racks 36 and thereby move the carriages 30, frames 14, and rack 10 inwardly or outwardly along the transverse beams 31.

Each of the shafts 25 is preferably provided with a telescoping section 38 which, together with the universal joints 26 and 28, provide sufficient flexibility to accommodate the transverse movement of the frames 14 hereinabove described.

It will thus be noted that a very simple, yet sturdy, mechanism has been provided for the safe and convenient handling and transportation of plate glass. To load the glass onto the transporting vehicle the racks 10 are first lowered to the full line position shown at the left in Fig. 1, in which position plates of glass may be readily packed onto the rack with the lower edges of the glass resting upon the ledge 12. The inward inclination of the rack facilitates the retention of the glass thereon, although additional securing means is ordinarily employed for that purpose. Each rack 10, thus loaded, is then elevated by operation of the chains 19 through the power driven shafts 24, 25 and 23 and the sprockets 22, until the lower edge of the rack clears the adjacent ends of the transverse beams 31. Then each rack, with its supporting frames 14 and carriages 30, is shifted inwardly, by operation of the shaft 34, into the position shown at the right of Fig. 1, in which position each rack 10 is supported in elevated position by the ends of the beams 31. That completes the loading operation.

It has been found that when equipped with mechanism, such as hereinabove described, two tons or more of plate glass may be loaded onto a truck in a fraction of the time ordinarily required by glass loading methods heretofore employed, with far less danger of glass breakage, and with practically no hazard to the men employed.

It will be noted that when the glass carrying mechanism is fully loaded and finally adjusted into transporting position, considerable space is available between the upright frames 14 to receive additional glazier's equipment, such as ladders, crates, etc., and in which such additional equipment may be safely carried without endangering the glass.

It will also be noted that both racks 10 may readily be lowered to clear any overhead obstructions, such as culverts or bridges that might be encountered along the highway.

The unloading operation is as simple as the loading operation hereinabove described. Preparatory to unloading, the racks 10 are shifted outwardly so as to clear the ends of the beams 31 and then lowered into the full line position shown at the left of Fig. 1, from which position the glass may readily be removed.

Various changes may be made in the embodiment of the invention hereinabove specifically described without departing from or sacrificing the advantages of the invention as defined in the appended claims.

I claim:—

1. In a vehicle for transporting sheet glass the combination of a frame, glass carrying racks at opposite sides of said frame, means for mounting said racks on said frame, said mounting means being adjustable transversely of said frame, and means for raising and lowering said racks on said mounting means.

2. In a vehicle for transporting sheet glass the combination of a frame, glass carrying racks at opposite sides of said frame, means for mounting said racks on said frame, means on said mounting means for lowering said racks into convenient loading position beside said frame and for elevating the same above said frame, and means for shifting said mounting means and racks transversely of said frame into position where said racks may be supported directly by said frame.

3. In a vehicle for transporting sheet glass the combination of a frame, glass carrying racks at opposite sides of said frame, means for mounting said racks on said frame, power actuated means for raising and lowering said racks on said mounting means, and manually actuated means for shifting said mounting means laterally of said frame.

VICTOR OLEN.